(12) United States Patent
Shums

(10) Patent No.: US 6,221,246 B1
(45) Date of Patent: Apr. 24, 2001

(54) FILTER HOUSING ASSEMBLY

(76) Inventor: Zakir H. Shums, 5918 Red Carriage La., Charlotte, NC (US) 28212-4645

( * ) Notice: Subject to any disclaimer, the term of this patent is extended or adjusted under 35 U.S.C. 154(b) by 0 days.

(21) Appl. No.: 09/655,320

(22) Filed: Sep. 5, 2000

Related U.S. Application Data

(63) Continuation of application No. 09/179,321, filed on Oct. 27, 1998, now abandoned.

(51) Int. Cl.[7] .................................................... B01D 35/34

(52) U.S. Cl. .......................... 210/248; 210/442; 210/453; 210/455; 210/457

(58) Field of Search ................................ 210/248, 323.2, 210/350, 435, 437, 438, 440–442, 450, 451, 453, 457, 458; 220/327, 366.1, 373, 374, 573

(56) References Cited

U.S. PATENT DOCUMENTS

| | | | | |
|---|---|---|---|---|
| 2,043,781 | * | 6/1936 | Sorenson et al. | 210/131 |
| 2,392,624 | * | 1/1946 | Tunis | 210/440 |
| 2,467,061 | * | 4/1949 | Mason | 210/327 |
| 2,568,181 | * | 9/1951 | Zimmerman et al. | 210/437 |
| 4,052,317 | * | 10/1977 | Palnik | 210/323.2 |
| 4,588,500 | * | 5/1986 | Sprenger et al. | 210/100 |
| 5,013,434 | * | 5/1991 | Furrow | 210/440 |

* cited by examiner

Primary Examiner—Matthew O. Savage
(74) Attorney, Agent, or Firm—Clifton T. Hunt

(57) ABSTRACT

A filter housing assembly has a tubular standpipe to support successive filter elements within a filter housing closed by a closure plate. A spindle is fixed to the inner surface of the closure plate in position to move into the upper end of the standpipe when the closure plate is in position to close the housing. A top filter support is fixed to the spindle in position to be seated on top of a filter in the housing when the closure plate is in position to close the housing. A skirt extends downwardly from the closure plate to deflect leaks.

7 Claims, 3 Drawing Sheets

FILTER HOUSING ASSEMBLY

CROSS REFERENCE TO RELATED APPLICATIONS

This application is a continuation of Application Ser. No. 09/179,321, filed by applicant on Oct. 27, 1998 for CLOSURE PLATE FOR FILTER HOUSING, now abandoned.

FIELD OF THE INVENTION

This invention relates to a filter housing assembly including a closure plate specifically structured to independently hold successive filters in place without the need for the prior art nut and threaded standpipe that blocked access to successive filters. The closure plate is also structured to deflect leaks of pressurized hot fluid.

BACKGROUND OF THE INVENTION

Hot oils or heat transfer fluids are used for the indirect heating of processes by circulating the heated fluid between hot oil boilers and reactor vessels, tanks, molds, calenders, extruders, or heat exchangers. Such fluids are subjected to temperatures ranging from 300° F. (149° C.) to 750° (399° C.) for heating applications in the chemical, plastics, rubber, petrochemical, pharmaceutical, pulp and paper, textile, and food industries.

It is known to incorporate filters into such systems to remove contaminates from the fluid. See, for example, U.S. Pat. Nos. 5,484,523; 5,264,119; 5,022,986 and 4,272,368. None of the filter housings described therein disclose or suggest the structure of the closure plate as described herein.

U.S. Pat. No. 5,484,523 shows a centrally positioned sleeve projecting from the inside of the cover and externally threaded to engage an internally threaded top end of a filter. This arrangement undesirably requires the steps of threading successive filters to the sleeve on the cover and of unthreading the filters from the cover when replacing filters.

U.S. Pat. No. 5,264,119 shows a filter support to be mounted in a cylindrical cavity formed in the head plug of the filter. The filter support is glued into place to prevent leaks and displacement of the filter support during maintenance. The head plug may be attached to a bearing plate which is the closure for the top of the filter housing.

The filter assembly of U.S. Pat. No. 5,022,986 has a cap with a downwardly directed cylindrical rib projecting into the upper end of the filter and an ear extending downward adjacent the inside of the filter. The cap is secured to the housing and engages the entire top of the filter.

U.S. Pat. No. 4,272,368 discloses an end closure for a filter housing which is a cup-shaped member having a center tubular projection which serves as a support member for the filter element. The cup-shaped member is either attached to the housing or to another member in order to provide closure for the housing.

It is known to provide filter elements specifically tor the filtration of hot oils at temperatures up to 700° F. (371° C.) and pressures up to 150 psig (1034 kPa). These filter elements, as in the present invention, are installed in housings that comprise a top closure plate and a filter housing. The closure plate is a blind flange removably connected, as by bolts, to a top flange on the filter housing, with a gasket between the closure plate and the top flange.

The filter housing has two compartments: an upper dirty chamber and a lower clean chamber. An imperforate bottom plate separates the two chambers. Liquids enter the housing through the upper chamber and then pass through a filter element and drain into the lower chamber.

The filter element, as in the present invention, consists of filter media wound on a perforated core. In the prior art, the filter element is installed on a rigid, perforated standpipe with an exteriorly threaded upper end and a bolt and washer are used to secure the filter element to the standpipe and hold the filter element in place, with the bottom end of the standpipe being threaded and screwed into a threaded hole in the bottom plate. FIG. 1 shows a filter housing assembly according to the prior art.

The filter elements must be periodically replaced during normal operation. Removal of a filter element requires removal of the closure plate, only after the filter has cooled and the pressure inside the housing has been relieved.

Several problems exist with the above-described conventional filter housing assembly. First, the cost of the bolt and of threading both ends of the standpipe is unnecessary. Second, the time and effort required to remove the bolt before removing a filter is unnecessary. Third, the closure plates of the prior art filter housings used for processing hot oils provide no protection from direct sprays of hot and pressurized liquid due to gasket failure, or improper sealing or misalignment during installation of the closure plate. Fourth, the filter element and the standpipe supporting the filter element lean under the very high pressures of liquid entering the upper chamber. This unnecessarily increases the difficulty of replacing a filter element.

SUMMARY OF THE INVENTION

The filter housing assembly of this invention includes a closure plate integrated with a spindle that is integrated with a top filter support to hold a filter element in place. A skirt encircles the closure plate to deflect leaks. The closure plate is a blind flange.

The spindle is integrated with the under side of the closure plate, as by welding, in position to slide into the top end of the tubular standpipe when the closure plate is operatively mounted on the top flange of the filter housing. The top filter support is integrated with the spindle, as by welding, in position to seat on the upper end of a filter and hold the filter in place when the closure plate is operatively installed.

The skirt is installed around the circumference of the closure plate in angularly spaced overlapping relation to the space created by a gasket between the closure plate and the top flange of the housing.

One object of this invention is to reduce the cost of the filter housing assembly. This is accomplished by integrating the closure plate with a spindle and top filter support and thereby eliminating the need for an expensive bolt and for threading the top end of the standpipe. The cost of the conventional threading on the bottom of the standpipe is also eliminated by integrating the bottom end of the standpipe with the bottom plate, as by welding.

Another object of the invention is to reduce the time necessary to replace filter elements within the filter housing. The invention allows access to the filter element by simply removing the closure plate rather than requiring the additional step of removing a bolt and washer before being able to remove a filter element.

Another object of the invention is to provide additional support for the filter element, which increases the pressure rating of the filter housing.

Still another object of the invention is to protect a person from a leak of pressurized hot liquid by providing a skirt that deflects the liquid and causes it to drip down the side of the filter housing.

DETAILED DESCRIPTION OF THE INVENTION

Figure 1:
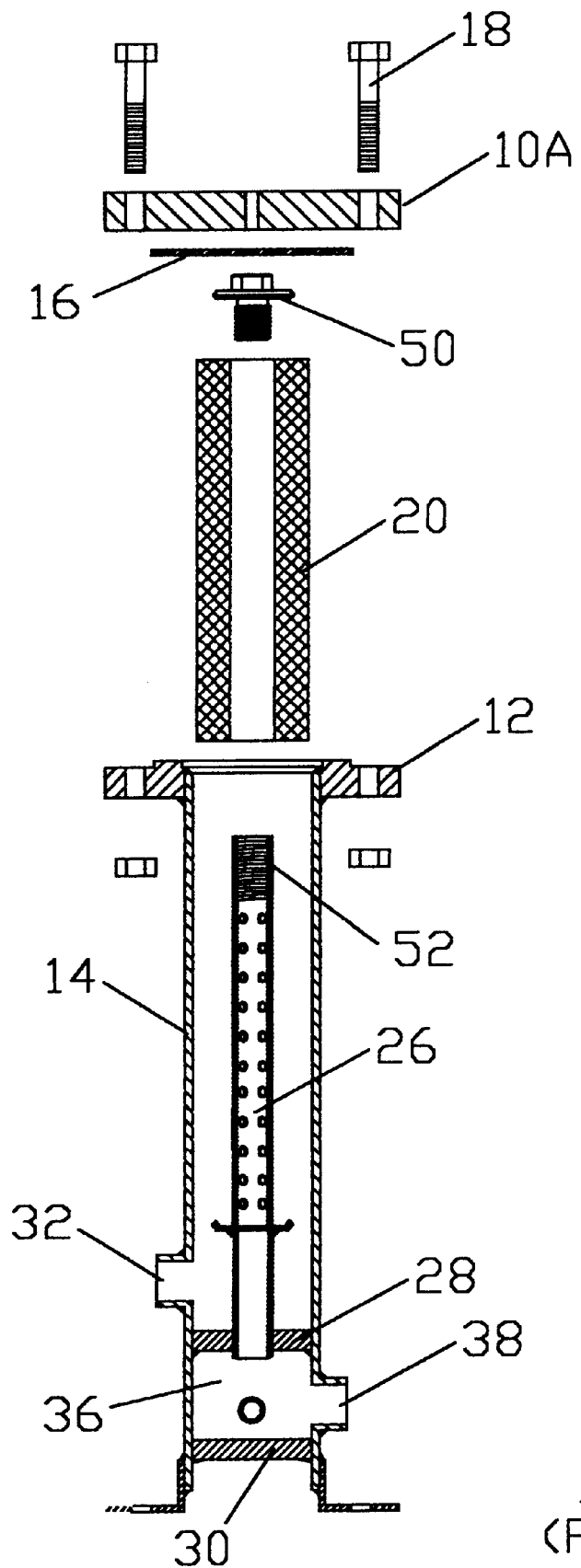
FIG. 1 is an exploded sectional view of a prior art filter housing assembly.
Figure 2:
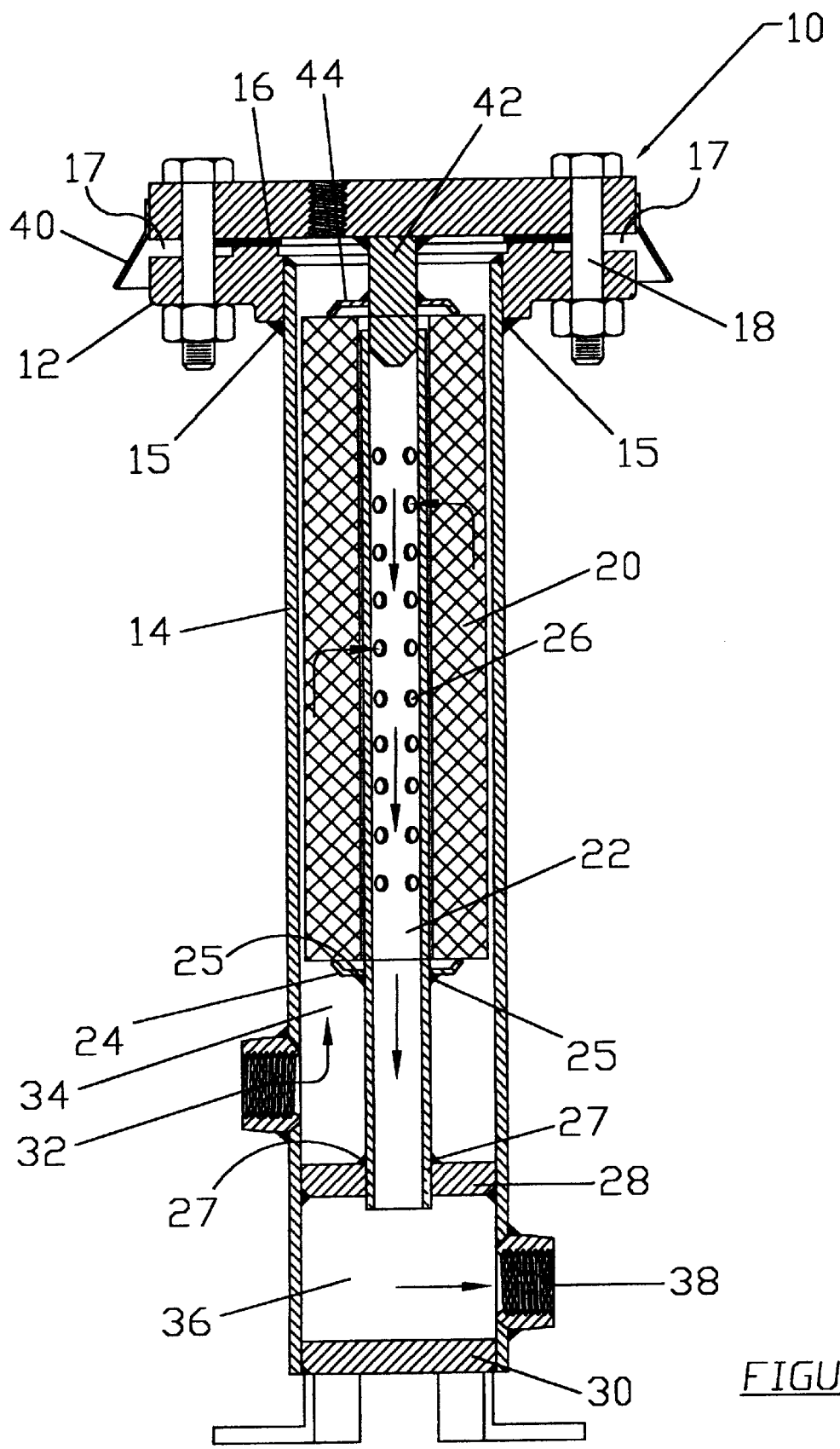
FIG. 2 is a vertical sectional view of a filter housing assembly, including the integrated closure plate, spindle and top filter support of the present invention.
Figure 3:
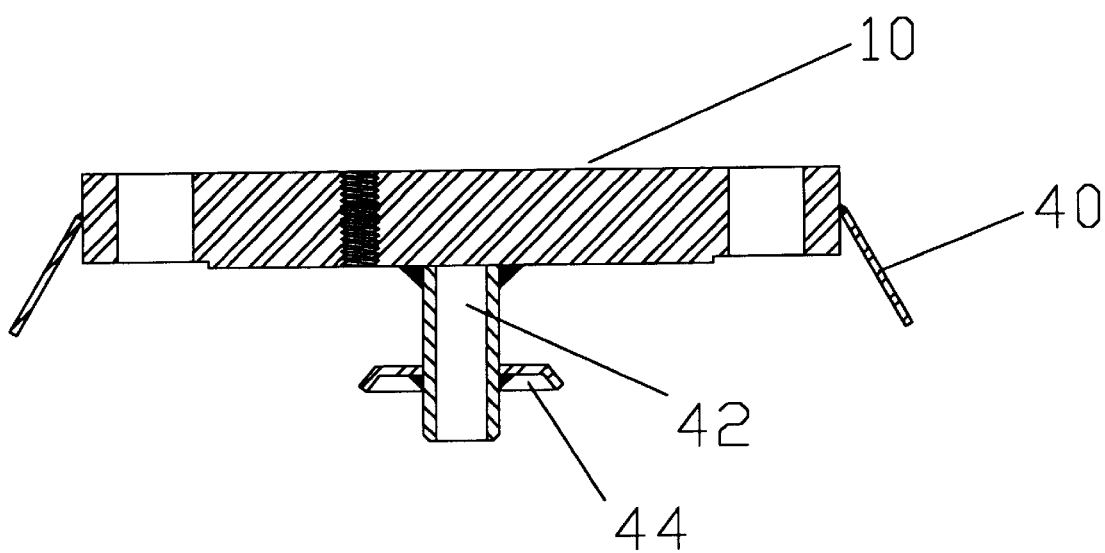
FIG. 3 is a vertical sectional view of the integrated closure plate, spindle and top filter support shown in FIG. 2.

Referring more specifically to the drawings, a closure plate according to the present invention is broadly indicated at 10 in FIGS. 2 and 3. A conventional closure plate is indicated at 10A in FIG. 1.

The closure plate 10 is mounted on a top flange 12 that extends circumferentially around the top of a filter housing 14 and is secured to the filter housing as by welding 15. Because the liquid to be filtered is under high pressure and temperature, the filter housing 14 requires a tight closure. A gasket 16 is seated between the closure plate 10 and the top flange 12 to provide a seal, resulting in an annular space 17 between the closure plate 10 and the top flange 12. Bolts 18 are used to removably fasten the closure plate 10 to the top flange 12.

The filter housing 14 contains a tubular standpipe 22 that is perforated as at 26 and penetrates an imperforate bottom plate 28. As shown in FIG. 2, the standpipe includes first and second opposite ends and an unobstructed flow channel extending from the first opposite end to the second opposite end. The standpipe 22 may be threadably connected to the bottom plate 28, but for very high pressure uses the standpipe is integrated with the bottom plate 28, as by welding 27.

A tubular filter element 20 is mounted on the standpipe 22. The lower end of the filter element 20 is supported by a bottom filter support 24 that is fastened to the standpipe 22, as by welding 25.

The liquid to be filtered enters the housing 14 at inlet 32, above the bottom plate 28. The liquid fills an upper dirty chamber 24 and moves radially inward through the filter element 20. The filtered liquid enters the standpipe 22 through the perforations 26 and flows downward into a lower clean chamber 36 beneath the bottom plate 28. The filtered liquid leaves the filter housing 14 through outlet 38.

The gasket 16 can fail due to wear or due to damage caused by the heat and pressure to which it is exposed, sometimes resulting in dangerous leaks of hot pressurized liquid. Leaks can also occur if the closure plate 10, the gasket 16, and the 8 top flange 12 are not properly installed or are misaligned. Because the liquid inside the filter housing 14 is under pressure and at a high temperature, leaks pose a very real danger to persons in the vicinity of the filter housing 14. Leaking pressurized liquid can pass forcibly through the annular space 17 between the closure plate 10 and the top flange 12.

A protective skirt 40 extends circumferentially around the closure plate 10. In use, the closure plate 10 is on top of the top flange 12, as shown in FIG. 2. The skirt 40 extends downwardly at an angle from an axial edge of the closure plate 10 a sufficient distance to cover the space 17 between the closure plate 10 and the top flange 12. The skirt is angled to deflect a jet of pressurized liquid inwardly toward the filter housing 14. In the preferred embodiment, the skirt 40 is bent outwardly at an angle of 30° from the closure plate 10.

The top of the filter 20 must be supported to withstand the force of the pressurized liquid that moves upwardly through the filter element 20. Support for the top of the filter 20 is provided by a spindle 42 and a top filter support 44. The spindle 42 is integrated, as by welding, with the closure plate 10 in position to move into the top of the tubular standpipe 22 when the closure plate 10 is operatively seated on the top flange 12, as shown in FIG. 2. The top filter support 44 is integrated, as by welding, with the spindle 42 in position to be firmly seated on the top of filter element 20 when the closure plate 10 is operatively seated on the top flange 12, as shown in FIG. 2. The spindle 42 has a free end that extends into the standpipe in use.

The integrated closure plate 10, spindle 42 and top filter support 44 provide more support for the standpipe 22 than the prior art apparatus of FIG. 1, where the filter element 20 is held in place by a bolt and washer 50 screwed into the top end of standpipe 26, which has been threaded as at 52 (FIG. 1). Use of the integrated closure plate 10, spindle 42 and top filter support 44 enables the filter to be used for fluids at pressures in excess of 150 psig (1034 kPa). The spindle 42 that slides into the standpipe 22 eliminates the need to thread the standpipe 22 and eliminates the need for an expensive bolt.

In the present invention, removing the closure plate 10 allows immediate access to the filter element 20, whereas the prior art requires the extra step of removing the bolt and washer.

In the preferred embodiment, the spindle 42, the top filter support 44 and the skirt 40 are welded into their respective positions.

Although specific terms have been used in describing the invention, they have been used in a generic and descriptive sense only and not for the purpose of limitation. The scope of the invention is defined in the following claims.

I claim:

1. In a filter housing assembly having a filter housing for a filter element, a closure plate, a top flange on the housing and bolts for removably attaching the closure plate to the top flange, the combination of:

A. a spindle extending rigidly from the closure plate, means for permanently fixing one end of the spindle to the closure plate with the other end of the spindle extending freely downwardly toward the filter element; and B. a top filter support fixed to the spindle in axially spaced relation to the closure plate and extending radially from the spindle to the top of the filter element, and means for rigidly fixing the top filter support to the spindle for movement therewith;

whereby the spindle and the top filter support are fixed for movement only with the closure plate, causing the spindle and the top filter support to be removed from the filter element simultaneously with the closure plate being removed from the top flange, and whereby the filter element becomes available for removal from the filter housing simultaneously with removal of the closure plate from the top flange.

2. A filter housing assembly according to claim 1 which includes a tubular standpipe and a bottom filter support on which filter element is mounted, and wherein the free end of the spindle is tapered and extends into the standpipe in use.

3. A filter housing assembly according to claim 1 wherein a skirt encircles the closure plate and extends downwardly from the closure plate.

4. A filter housing assembly according to claim 3 wherein the skirt flares outwardly at an angle from an axial edge of the closure plate.

5. A filter housing according to claim 4 wherein the skirt flares outwardly at an angle of 30° from an axial edge of the closure plate.

6. A filter housing assembly comprising a filter housing for a filter element, a closure plate, a top flange on the housing, means for removably attaching the closure plate to the top flange, a perforated and tubular standpipe having first and second opposite ends and an unobstructed flow channel extending from the first opposite end to the second opposite end, means rigidly supporting the standpipe within the filter housing, and spindle means integral with the closure plate for engaging the standpipe for use and for enabling immediate access to the filter element simultaneously with removal of the closure plate from the top flange.

7. A filter housing assembly according to claim 6 further comprising a top filter support rigidly fixed to the spindle for movement therewith and extending radially from the spindle to the top of a filter element in use.

* * * * *